US006993048B1

(12) United States Patent
Ah Sue

(10) Patent No.: US 6,993,048 B1
(45) Date of Patent: Jan. 31, 2006

(54) ATM PERMANENT VIRTUAL CIRCUIT AND LAYER 3 AUTO-CONFIGURATION FOR DIGITAL SUBSCRIBER LINE CUSTOMER PREMISES EQUIPMENT

(75) Inventor: John D. Ah Sue, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 09/629,318

(22) Filed: Jul. 31, 2000

(51) Int. Cl.
*H04J 1/02* (2006.01)

(52) U.S. Cl. ................. 370/493; 370/395.3; 370/236.2

(58) Field of Classification Search ............. 370/236.1, 370/236.2, 238.1, 352, 353, 354, 355, 356, 370/395.1, 397, 398, 409, 493, 494, 495, 370/399, 395.3
See application file for complete search history.

(56) References Cited

U.S. PATENT DOCUMENTS 5,237,564 A 8/1993 Lespagnol et al. ......... 370/60.1
5,274,643 A 12/1993 Fisk .......................... 370/94.1
5,305,311 A 4/1994 Lyles .......................... 370/60
5,311,509 A 5/1994 Heddes et al. ................ 370/60
5,313,454 A 5/1994 Bustini et al. ................ 370/13
5,327,421 A 7/1994 Hiller et al. ............... 370/60.1
5,345,445 A 9/1994 Hiller et al. ............... 370/60.1
5,345,446 A 9/1994 Hiller et al. ............... 370/60.1
5,365,524 A 11/1994 Hiller et al. ............... 370/94.2
5,390,170 A 2/1995 Sawant et al. ............. 370/58.1
5,390,175 A 2/1995 Hiller et al. .................. 370/60
5,394,402 A 2/1995 Ross ......................... 370/94.1
5,400,325 A 3/1995 Chatwani et al. .......... 370/60.1
5,408,469 A 4/1995 Opher et al. ............... 370/60.1
5,422,882 A 6/1995 Hiller et al. ............... 370/60.1
5,426,636 A 6/1995 Hiller et al. ............... 370/60.1
5,428,607 A 6/1995 Hiller et al. ............... 370/60.1
5,430,715 A 7/1995 Corbalis et al. .............. 370/54
5,452,297 A 9/1995 Hiller et al. ............... 370/60.1
5,555,244 A 9/1996 Gupta et al. ............... 370/60.1
5,583,862 A 12/1996 Callon ........................ 370/397
5,610,910 A 3/1997 Focsaneanu et al. ........ 370/351
5,740,176 A 4/1998 Gupta et al. ................ 370/440
5,742,604 A 4/1998 Edsall et al. ................ 370/401
5,799,017 A 8/1998 Gupta et al. ................ 370/419
5,864,542 A 1/1999 Gupta et al. ................ 370/257
5,883,893 A 3/1999 Rumer et al. ............... 370/395

(Continued)

FOREIGN PATENT DOCUMENTS

WO 95/20850 8/1995

(Continued)

OTHER PUBLICATIONS

Cisco 6400 Access Concentrators, printed from http://www.cisco.com/warp/public/cc/pd/as/6400/index.shtml on Sep. 27, 2000.

(Continued)

*Primary Examiner*—Duc Ho
*Assistant Examiner*—Thien D. Tran
(74) *Attorney, Agent, or Firm*—Thelen Reid & Priest LLP; David B. Ritchie

(57) ABSTRACT

The present invention pertains to a method and device for automatically configuring the Permanent Virtual Circuit (PVC) of a Digital Subscriber Line (DSL) Customer Premises Equipment (CPE) and link it to a software interface. The method comprises receiving an ATM cell and checking the ATM cell for an OAM Fault Management (F5) type cell. The OAM type cell allows the PVC to be configured by obtaining a VPI and VCI from the OAM type cell. Otherwise, the CPE configures its new PVC by obtaining a VPI and VCI from a first traffic bearing cell and linking its new PVC to a protocol specific to DSL.

7 Claims, 5 Drawing Sheets

U.S. PATENT DOCUMENTS

| | | | | |
|---|---|---|---|---|
| 5,953,336 | A | 9/1999 | Moore et al. | 370/395 |
| 6,028,867 | A * | 2/2000 | Rawson et al. | 370/463 |
| 6,285,671 | B1 * | 9/2001 | Bossemeyer et al. | 370/352 |
| 6,480,494 | B1 * | 11/2002 | Hawley | 370/395.61 |
| 6,597,689 | B1 * | 7/2003 | Chiu et al. | 370/354 |

FOREIGN PATENT DOCUMENTS

| | | |
|---|---|---|
| WO | 97/13382 | 4/1997 |
| WO | 97/38511 | 10/1997 |

OTHER PUBLICATIONS

Cisco 6400 Series Universal Access Concentrator, Data Sheet, printed from http://www.cisco.com/warp.public.cc.p-d.as.6400,prodlit/6400_ds.htm on Sep. 27, 2000.

Cisco 6400 Universal Access Concentrator, Product Bulletin—No. 1120, printed from http:/www.cisco.com/warp/public/cc/pd/as/6400/prodlit/1120_pp.htm on Oct. 4, 2000.

Cisco Asymmetric Digital Subscriber Line Services Architecture, White paper, printed from http//www.cisco.com/warp.public/cc/so/neso/dsso/global/adsl_wp.htm on Sep. 27, 2000.

Esaki, et al., "Datagram Delivery in an ATM-Internet", Mar. 1994, IEICE Trans. Commun., vol. E77-B, No. 3, pp. 314-326.

Layer 2 Tunnel Protocol, Release 12.0(1)T and 11.3(5)AA.

"L2TP", 1998, Mecklermedia Corporation, printed from http://webopedia.internet.com/TERM/L/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~12tp/ftp/draft-ietf-pppext-12tp-security-02.txt. on Sep. 21, 1998.

Valencia, et al., "Layer Two Tunneling Protocol L2TP", PPP Working Group, May 1998.

* cited by examiner

ATM PERMANENT VIRTUAL CIRCUIT AND LAYER 3 AUTO-CONFIGURATION FOR DIGITAL SUBSCRIBER LINE CUSTOMER PREMISES EQUIPMENT

BACKGROUND OF THE INVENTION

1. Field of the Invention

The present invention relates to a Customer Premises Equipment (CPE) device having its Asynchronous Transfer Mode (ATM) interface automatically configured. More particularly, the present invention relates to a method for configuring a Permanent Virtual Circuit (PVC) and layer 3 of a CPE device over an ATM interface.

2. Background Art

ATM is a packet-switching technology that uses fixed-size packets, referred to as cells, to carry the traffic in a network. The ATM standard allows transmission of intermixed audio, video, and data over high-speed links. As well as being used in wide-area networks, the ATM standard can be used for local-area networks to support multimedia applications.

The unit of transmission used in the ATM standard is a cell. As shown in FIG. 1, an ATM cell 100 contains 53 bytes of information and has a five-byte header field 102 and a 48-byte payload field 104 carrying data. Header field 102 contains a Virtual Path Identifier (VPI) 106 and a Virtual Channel Identifier (VCI) 108 which are used for switching cell 100 through an ATM network. ATM header field 102 uniquely determines parameters associated with a given connection. Within an end user interface such as a computer, multiple connections can be going on at the same time.

Within a switch, each ATM cell is switched based on the information contained in its header; more specifically based on its VPI and VCI as shown in FIG. 1. A combination of VCI and VPI bits are used to index lookup tables that contain the switching information.

FIG. 2 illustrates the relationship between a physical transmission circuit 200 and a Virtual Path (VP) 202 and a Virtual Channel (VC) 204. Physical circuit 200 supports one or more virtual paths 202. Virtual path 202 may support one or more virtual channels 204. Thus, multiple virtual channels can be trunked over a single virtual path 202. ATM switching and multiplexing operate at either the virtual path or virtual channel level.

ADSL Customer Premises Equipment is usually configured with one Permanent Virtual Circuit (PVC) over which PPP or bridged request for comments (RFC) 1483 protocol traffic is supported. The RFC 1483 protocol is dated July 1993 published by Telecom Finland. In a PVC network, such as ATM, when a circuit is established, the route is chosen from source to destination, and all switches (e.g. routers) along the way may take entries so that they can switch any cells on that virtual circuit. When a cell comes along, a switch inspects the cell's header to find out which virtual circuit it belongs to. Then it looks up that virtual circuit in its tables to determine which output communication line to direct cell to. Therefore, there is an agreement between a customer and a service provider that the switches will always hold table entries for a particular destination, even if there has been no traffic for months.

FIG. 3 illustrates ATM cell switching using VPI and VCI values. Switch 300 maps VPIs and VCIs to different VPIs and VCIs at a connecting point 302. The network therefore ties together the VPIs and VCIs used on a link 304 within a physical transmission path 306 to deliver an end-to-end connection to end points 308.

In an end-user network such as the one illustrated in FIG. 4, a CPE device 400 communicates with a remote Digital Subscriber Line Access Multiplexer (DSLAM) 402 through a transmission path 404 having a PVC defined by a VPI and a VCI. DSLAM 402 communicates with an aggregator 418 connected to the Internet 420. CPE device 400 typically comprises of an ATM interface 406 and a LAN interface 408 connected to a network of PCs 410 through an ethernet 412. Although CPE device 400 can have ATM interface 406 dynamically configured with IPCP address negotiation and DHCP client support that belong to layer 3 of a DSL protocol stack as shown in FIG. 5, the ATM PVC still needs to be pre-configured with a VPI and a VCI. A service provider deploying its CPE device actually knows the VPI and VCI for the PVC. However, a customer replacing, for example, a bridge with a router, may not know the VPI and VCI of the PVC that he or she is using. A second problem arises when CPE device 400 must determine a type of encapsulation, e.g. PPP over ATM software interface 414 or RFC 1483 bridge 416.

A need therefore exists for a method and a device that enable a CPE device to automatically configure its PVC and then link it to an interface such as PPP or RFC bridging so that both layer 2 (ATM PVC) and layer 3 (DHCP or IPCP) auto- configuration is achieved. Thus, a customer who buys the CPE device would not need to contact the service provider to find out about the VPI and VPC for the PVC. If the service provider sends rfc 1483 bridged traffic or PPP traffic (assuming that CHAP or PAP is not used), the customer would just need to plug the CPE device in and allow it to auto-configure itself.

BRIEF DESCRIPTION OF THE INVENTION

The present invention pertains to a method and device for automatically configuring the Permanent Virtual Circuit (PVC) of a Digital Subscriber Line (DSL) Customer Premises Equipment (CPE) and link it to a software interface. The method comprises receiving an ATM cell and checking the ATM cell for an OAM Fault Management (F5) type cell. The OAM type cell allows the PVC to be configured by obtaining a VPI and VCI from the OAM type cell. Otherwise, the CPE configures its new PVC by obtaining a VPI and VCI from a first traffic bearing cell and linking its new PVC to a protocol specific to DSL.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings.

DETAILED DESCRIPTION OF A PREFERRED EMBODIMENT

One embodiment of the present invention is described herein in the context of an Asynchronous Transfer Mode virtual circuit and layer 3 auto-configuration for digital subscriber line customer premises equipment. Those of ordinary skill in the art will realize that the following description of the present invention is illustrative only and not in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all the routine features of the implementations described herein as described. It will of course be appreciated that in the development of any such actual implementation, numerous implementation-specific decisions must be made to achieve the developers specific goals, such as compliance with system and business related constraints, and that these goals will vary from one implementation to another. Moreover, it will be appreciated that such development effort might be complex and time-consuming, but would nevertheless be a routine undertaking of engineering for those of ordinary skill in the art having the benefit of this disclosure.

In accordance with a presently preferred embodiment of the present invention, the components, process steps, and/or data structures are implemented using an electrical circuit in a Digital Subscriber Line customer premises equipment. This implementation is not intended to be limiting in any way. Different implementations may be used and may include other types of electrical circuits, computing platforms, program storage devices and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Figure 4:
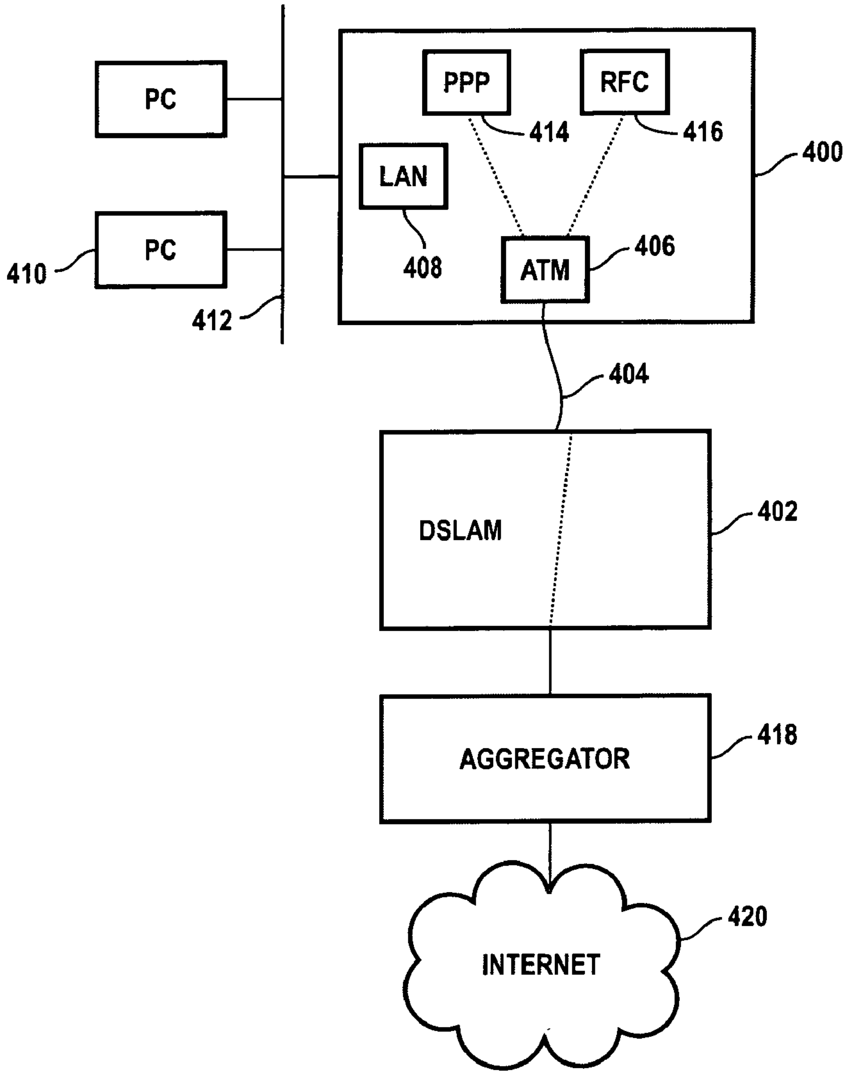
FIG. 4 is a block diagram illustrating an end user network in an ATM circuit.

FIG. 4 is a block diagram illustrating an end user network in an ATM circuit.

Figure 5:
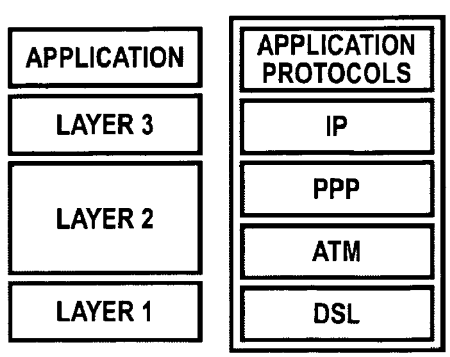
FIG. 5 is a schematic diagram illustrating the protocol layers in a DSL connection.

FIG. 5 is a schematic diagram illustrating the protocol layers in a DSL connection.

Figure 6:
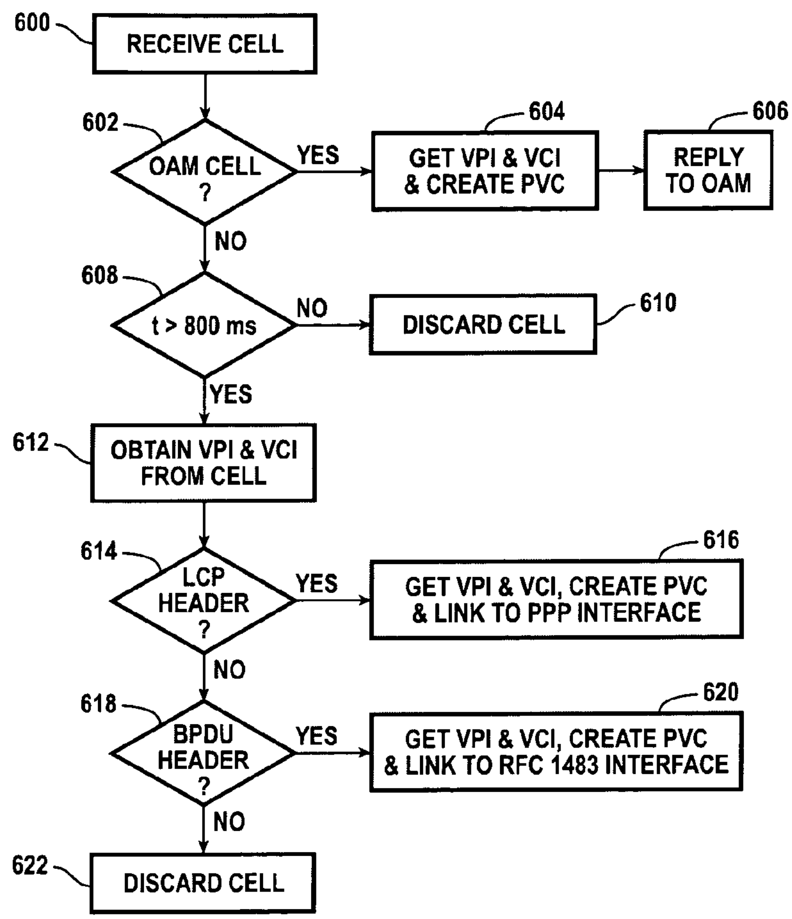
FIG. 6 is a flow chart illustrating a method to automatically configure PVC and layer 3 in accordance with a specific embodiment of the present invention.

FIG. 6 is a flow chart illustrating a method to automatically configure a Permanent Virtual Circuit of a Digital Subscriber Line CPE and layer 3.

Referring now to FIGS. 4, 5, and 6, a CPE device 400 that automatically configures its PVC would perform the following steps.

Figure 7:
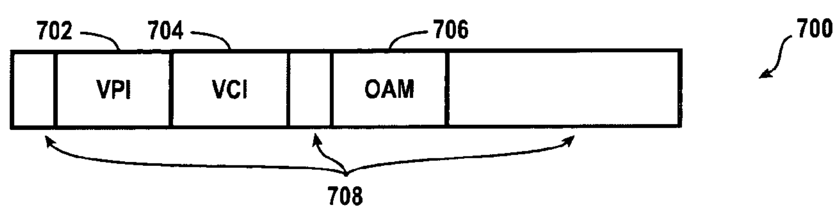
FIG. 7 is a schematic diagram illustrating an Asynchronous Data Transmission of cells in an ATM circuit.

At step 600, CPE 400 receives a cell from a DSLAM 402 through a physical transmission path 404. At step 602, CPE 400 examines the received cell. If the received cell is determined to be an Operations and Maintenance (OAM) cell, step 604 is performed. OAM cells are special purpose cells whose function provide a set of diagnostic and alarm reporting mechanisms such as fault management. As illustrated in FIG. 7, an OAM cell 700 includes a VPI 702, a VCI 704, an OAM field 706 and other fields 708. CPE 400 therefore can identify whether it received OAM cell 700 by looking at the received cell content for OAM field 706. At step 604, CPE 400 may grab VPI 702 and VCI 704 from OAM cell 700 and therefore create a PVC since both VPI and VCI are known. Once the PVC is created, CPE 400 replies to OAM cell 700 according to its function whether it is fault management or performance management at step 606. Otherwise, if the received cell is not an OAM cell, step 608 is performed.

Figure 8:
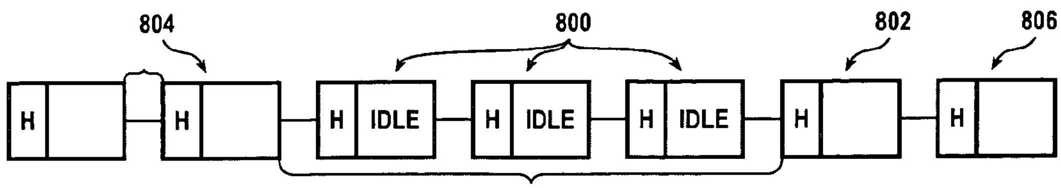
FIG. 8 is a schematic diagram illustrating an ATM cell containing an OAM function.

At step 608, CPE 400 determines whether the received cell is a first cell of a packet by measuring the elapse time between the received cell and a previous cell on the same PVC. FIG. 8 illustrates the flow of cells in an asynchronous transmission. Although idle cells 800 separate traffic bearing cells 802 and 804, idle cells 800 are discarded automatically by physical layer of CPE 400. The elapse time between traffic bearing cells 802 and 806 is usually less than 50 ms whereas the elapsed time between the first cell of a BPDU (PPP) packet and the last call of the previous BPDU (PPP) packet is more than 800 ms. At step 610, once CPE 400 determines that the elapse time between traffic bearing cells is less than 800 ms, CPE 400 discards the received cell through a buffer. Otherwise, if the received cell is first traffic bearing cell 802 following idle cells 800, step 612 is performed.

Figure 1:
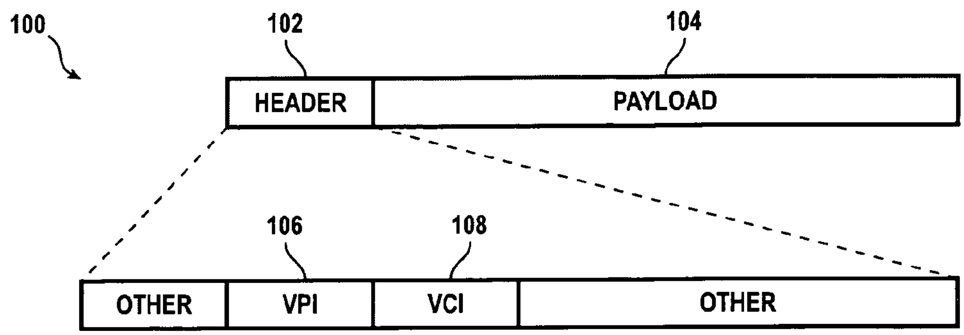
FIG. 1 is a schematic diagram illustrating the composition of an ATM cell including in detail its header.
Figure 2:
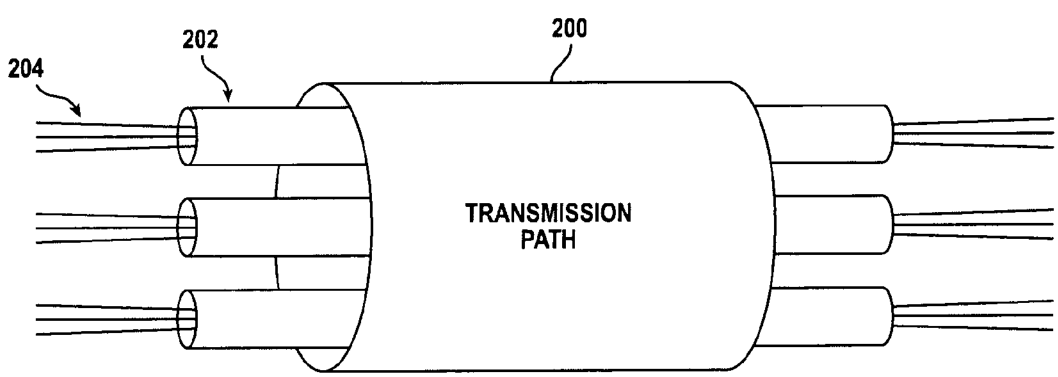
FIG. 2 is a schematic diagram illustrating Virtual Circuits and Virtual Paths within a transmission path in an ATM network.
Figure 3:
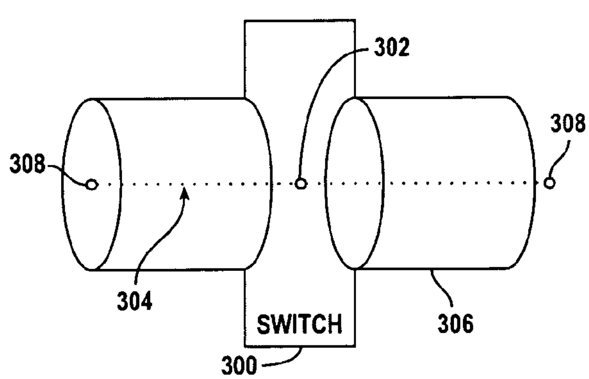
FIG. 3 is a schematic diagram illustrating Virtual Path Identifier and Virtual Channel Identification switching in an ATM node or switch.

At step 612, CPE 400 can then grab the VPI and VCI from the received cell because traffic bearing cells contain VPI and VCI in their header as previously illustrated in FIG. 1.

When a Service Provider configures an aggregate router, such as aggregator 418, to support protocols such as PPP or bridged RFC 1483 over ATM, CPE 400 receives many messages from the aggregate router. In the case of PPP over ATM protocol, CPE 400 receives regular Link Control Protocol (LCP) configuration requests messages. In the case of bridged RFC 1483, CPE 400 receives regular (Bridge Protocol Data Unit) BPDU spanning tree messages. Instead of discarding the received ATM cells containing these messages because no PVC is configured, CPE 400 can instead look inside these cells and try to determine whether they contain a valid LCP header or a BPDU header.

Figure 9:
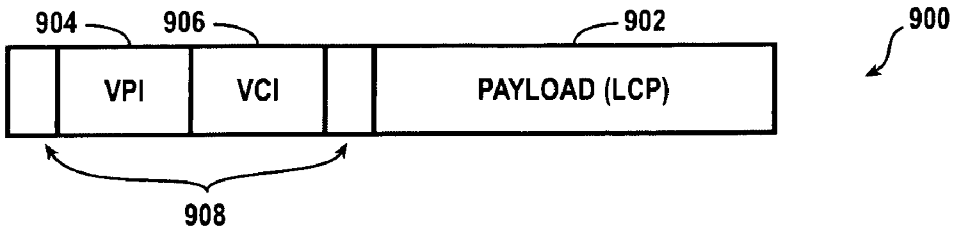
FIG. 9 is a schematic diagram illustrating a cell transmitted through an aggregate router to support PPP over ATM.

At step 614, CPE 400 determines whether the received cell contains an LCP header as shown in FIG. 9. In a cell 900 containing an LCP header, a payload 902 has its protocol values set to LCP. LCP Cell 900 also contains other fields 908. When a cell containing an LCP header is received, step 616 is performed. At step 616, CPE 400 looks at the received LCP cell 900 to obtain VPI 904 and VCI 906 enabling configuration of a new PVC only if VPI 904 and VCI 906 of PPP PVC are the same as VPI 702 and VCI 704 of OAM cell 700. Once the new PVC is configured, CPE 400 links the new PVC to PPP interface module 414, as shown in FIG. 4, so as to bring up the PPP interface to start layer 3 auto-configuration. Otherwise, if the received cell does not contain a LCP, CPE 400 performs step 618.

Figure 10:
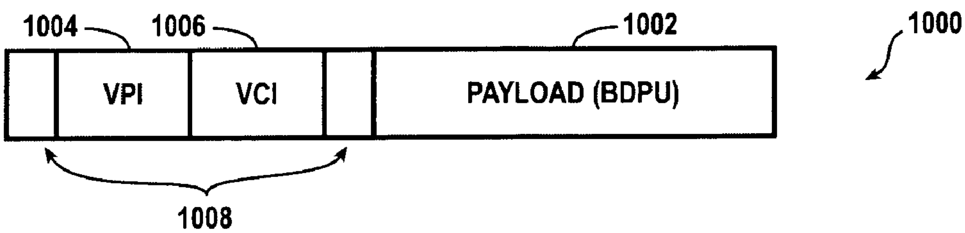
FIG. 10 is a schematic diagram illustrating a composition of a cell transmitted through an aggregate router to support bridged rfc 1483 over ATM.

At step 618, CPE 400 determines whether the received cell contains a BPDU header as shown in FIG. 10. In a cell 1000 containing a BPDU header, a payload 1002 has its protocol values set to BPDU. BPDU cell 1000 also contains other fields 1008. When a cell containing a BPDU header is received, step 620 is performed. At step 620, CPE 400 looks at the received BPDU cell 1000 to obtain VPI 1004 and VCI 1006 enabling configuration of a new PVC only if VPI 1004 and VCI 1006 of BPDU PVC are the same as VPI 702 and VCI 704 of OAM cell 700. Once the new PVC is configured, CPE 400 links the new PVC to RFC interface module 416, as shown in FIG. 4, so as to bring up the RFC 1483 bridged interface to start layer 3 auto-configuration. Otherwise, if the received cell does not contain BPDU, the received cell is discarded at step 622.

Another implementation of the present invention may be in the form of a program storage device readable by a machine, embodying a program of instructions, executable by the machine to perform a method for auto-configuring a Permanent Virtual Circuit (PVC) of a customer premises equipment device over an Asynchronous Transfer Mode (ATM) network.

While embodiments and applications of this invention have been shown and described, it would be apparent to those skilled in the art having the benefit of this disclosure that many more modifications than mentioned above are possible without departing from the inventive concepts herein.

Figure 11:
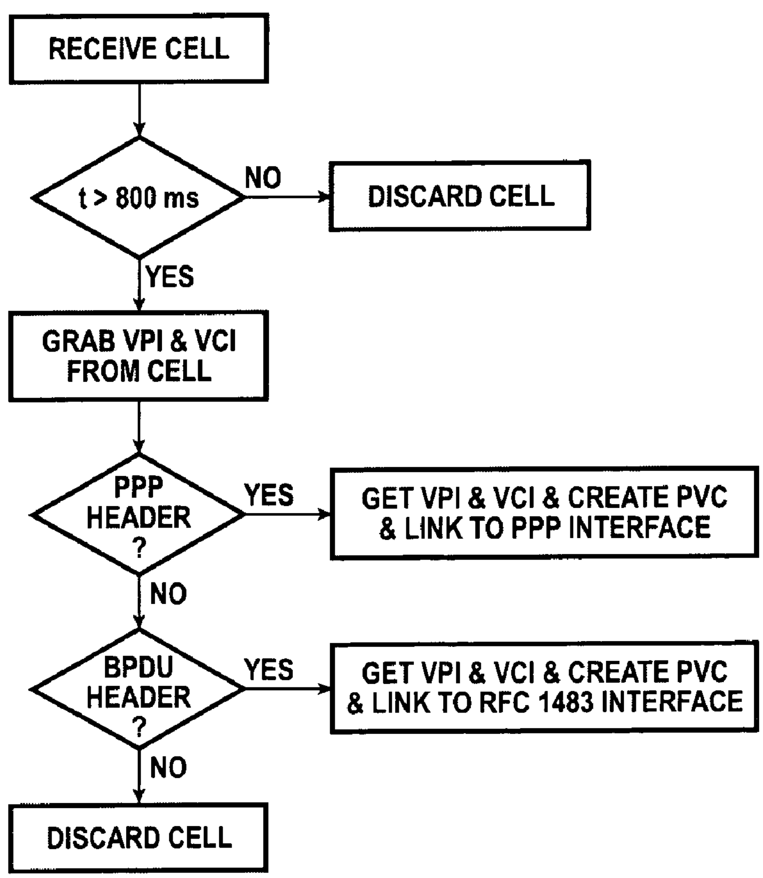
FIG. 11 is a flow chart illustrating a method to automatically configure PVC and layer 3 in accordance with an alternative embodiment of the present invention.
Figure 12:
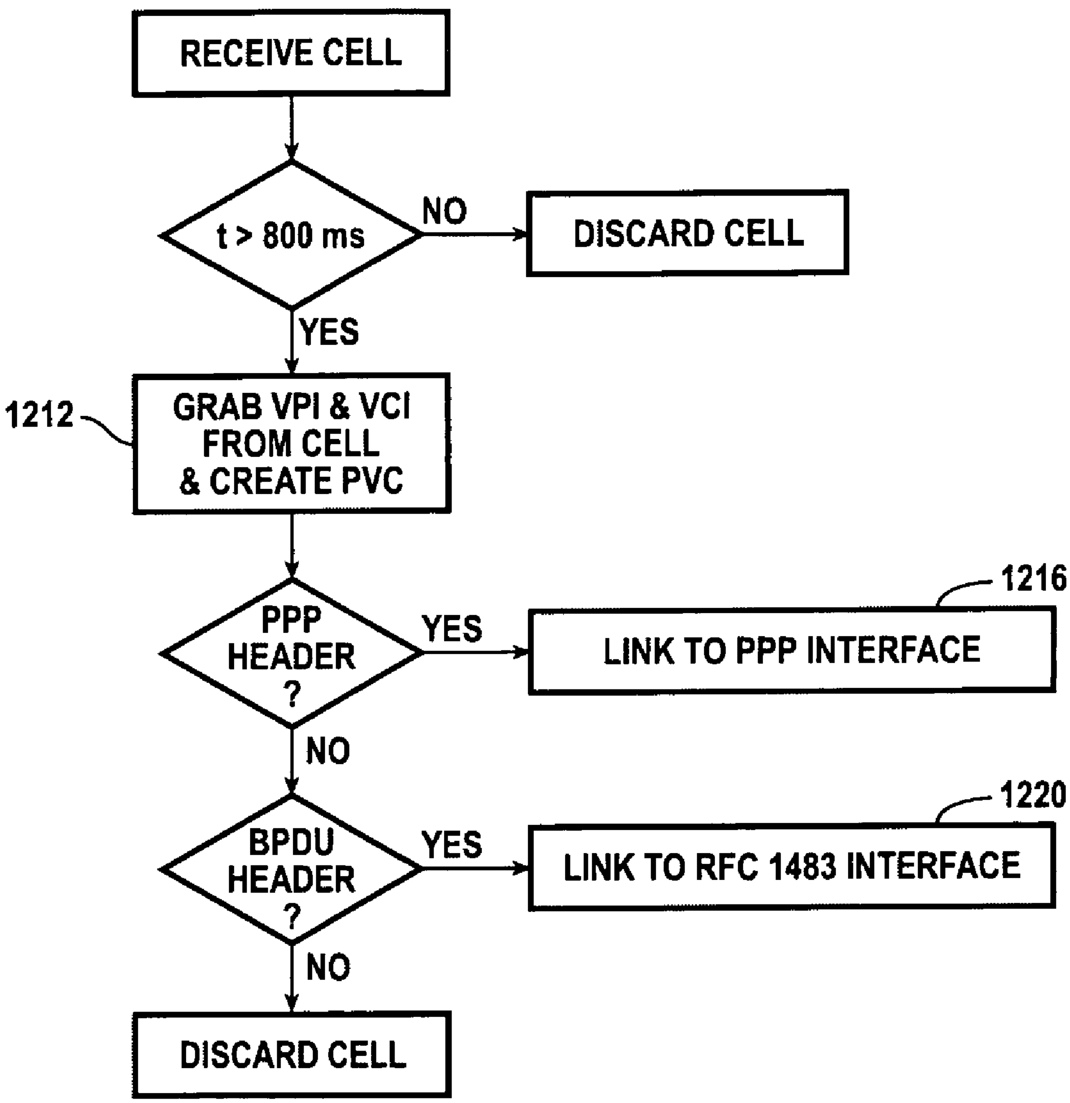
FIG. 12 is a flow chart illustrating a method to automatically configure PVC and layer 3 in accordance with an alternative embodiment of the present invention.

For example, FIG. 11 illustrates an alternative embodiment of the present invention. OAM cells are not identified by CPE device 400 since they are likely not to be received by CPE device 400. FIG. 12 illustrates another alternative embodiment of the present invention. At step 1212, after determining the VPI and VCI, CPE device 400 may create the new PVC in the same step 1212 instead of waiting until step 1216 or step 1220 when the new PVC is linked to PPP interface or RFC 1483 interface.

In addition, the present invention is not limited to protocol such as PPP or RFC 1483 but may be applied to any other protocol specific to DSL that sends periodically cells that are differentiable.

The invention, therefore, is not to be restricted except in the spirit of the appended claims.

What is claimed is:

1. A method for a customer premises equipment (CPE) device to auto-configure itself, said CPE device being coupled to an Asynchronous Transfer Mode (ATM) network, said ATM network having a preexisting Permanent Virtual Circuit (PVC) to which said CPE device is to be self auto-configured, said method comprising:

receiving a plurality of ATM cells from a digital subscriber line access multiplexer;

checking said plurality of ATM cells for an Operation and Maintenance (OAM) cell, said OAM cell allowing the PVC to be directly auto-configured by having the CPE device by itself obtain a Virtual Path Identifier (VPI) and a Virtual Circuit Identifier (VCI) from said OAM cell; and replying to said OAM cell in a suitable manner.

2. A method in accordance with claim 1, wherein said OAM cell is used for exchanging control and maintaining the ATM network running.

3. An Asynchronous Transfer Mode (ATM) communications system comprising:

a digital subscriber line access module receiving a plurality of ATM cells; and a customer premises equipment device having a mechanism which directly auto-configures to a preexisting Permanent Virtual Circuit (PVC), said mechanism receiving an ATM cell, said mechanism checking said ATM cell for an Operation and Maintenance (OAM) cell, said OAM cell allowing self configuring said PVC by reading a Virtual Path Identifier (VPI) and a Virtual Channel Identifier (VCI) from said OAM, and said mechanism replying to said OAM cell in a suitable manner.

4. An Asynchronous Transfer Mode communications system in accordance with claim 3, wherein said OAM cell is used for exchanging control and maintaining said ATM communication system.

5. A customer premises equipment device coupled to an Asynchronous Transfer Mode (ATM) network, said device being capable of directly auto-configuring itself, said ATM network having a preexisting Permanent Virtual Circuit (PVC) to which said device is to be self auto-configured, said device comprising:

means for receiving a plurality of ATM cells from a digital subscriber line access multiplexer;

means for checking said plurality of ATM cells for an Operation and Maintenance (OAM) cell, said OAM cell allowing said device to directly self auto-configure said PVC by reading a Virtual Path Identifier (VPI) and a Virtual Circuit Identifier (VCI) from said OAM cell; and means for replying to said OAM cell in a suitable manner.

6. A program storage device readable by a machine, embodying a program of instructions, executable by the machine to perform a method for a customer premises equipment (CPE) device to auto-configure itself, said CPE device being coupled to an Asynchronous Transfer Mode (ATM) network, said ATM network having a preexisting Permanent Virtual Circuit (PVC) to which said CPE device is to be self auto-configured, said method comprising:

receiving a plurality of ATM cells from a digital subscriber line access multiplexer;

checking said plurality of ATM cells for an Operation and Maintenance (OAM) cell, said OAM cell allowing the PVC to be directly auto-configured by having the CPE device by itself obtain a Virtual Path Identifier (VPI) and a Virtual Circuit Identifier (VCI) from said OAM cell; and replying to said OAM cell in a suitable manner.

7. A program storage device in accordance with claim 6, wherein said OAM cell is used for exchanging control and maintaining the ATM network running.

* * * * *